US011698190B2

(12) United States Patent
Scott

(10) Patent No.: US 11,698,190 B2
(45) Date of Patent: Jul. 11, 2023

(54) GAS GRILL WITH TEMPERATURE CONTROL

(71) Applicant: CANADIAN TIRE CORPORATION, LIMITED, Toronto (CA)

(72) Inventor: Jim Scott, Cambridge (CA)

(73) Assignee: CANADIAN TIRE CORPORATION, LIMITED, Toronto (CA)

( * ) Notice: Subject to any disclaimer, the term of this patent is extended or adjusted under 35 U.S.C. 154(b) by 264 days.

(21) Appl. No.: 16/931,310

(22) Filed: Jul. 16, 2020

(65) Prior Publication Data

US 2022/0018539 A1    Jan. 20, 2022

(51) Int. Cl.
| | |
|---|---|
| A47J 37/07 | (2006.01) |
| F23N 5/06 | (2006.01) |
| F16K 31/00 | (2006.01) |
| F16K 17/38 | (2006.01) |

(52) U.S. Cl.
CPC .......... *F23N 5/067* (2013.01); *A47J 37/0713* (2013.01); *F16K 17/38* (2013.01); *F16K 31/002* (2013.01); *F23N 2235/18* (2020.01); *F23N 2235/24* (2020.01); *F23N 2241/08* (2020.01)

(58) Field of Classification Search
CPC .. F23N 5/067; F23N 2241/08; F23N 2235/18; F23N 2235/24; A47J 37/0713; F16K 17/38; F16K 31/002
USPC ...................................................... 126/39 R
See application file for complete search history.

(56) References Cited

U.S. PATENT DOCUMENTS

| | | | | |
|---|---|---|---|---|
| 2,846,147 A | * | 8/1958 | Keating | A47J 37/1266 126/374.1 |
| 4,521,183 A | * | 6/1985 | Hirai | F24C 3/128 432/37 |
| 4,922,887 A | * | 5/1990 | Foxford | A47J 37/0713 126/41 R |
| 4,930,488 A | * | 6/1990 | Pearman | F24C 3/12 126/39 BA |
| 5,261,322 A | * | 11/1993 | Yokoyama | F23C 15/00 210/DIG. 8 |

(Continued)

FOREIGN PATENT DOCUMENTS

| | | |
|---|---|---|
| CN | 206137958 U | 5/2017 |
| ES | 1200311 | 11/2017 |
| GB | 2469091 A | 10/2010 |

OTHER PUBLICATIONS

English translation of Spain patent document No. ES 1200311U dated Nov. 29, 2017, https://patents.google.com/patent/ES1200311U . . . , accessed on Feb. 3, 2020.

(Continued)

*Primary Examiner* — Avinash A Savani
(74) *Attorney, Agent, or Firm* — Norton Rose Fulbright Canada LLP

(57) ABSTRACT

Systems and methods for operating a gas-fired appliance such as a gas-fired cooking grill are provided. An embodiment of the system includes a gas burner for heating a chamber of the gas-fired appliance. The system includes a first valve associated with the gas burner to control a gas flow to the gas burner. The system includes a second valve configured to controllably supply gas to the gas burner via the first valve. The second valve is automatically adjustable based on a desired temperature of the chamber and an actual temperature of the chamber.

14 Claims, 13 Drawing Sheets

(56) References Cited

U.S. PATENT DOCUMENTS

| | | | |
|---|---|---|---|
| 5,975,884 A | 11/1999 | Barry | |
| 6,289,792 B1* | 9/2001 | Grando | F24C 3/126 126/41 R |
| 7,748,374 B2* | 7/2010 | Gnadinger | F24C 3/126 126/39 BA |
| 8,025,007 B1* | 9/2011 | Boyer | A47J 37/1242 99/450 |
| 10,021,887 B2 | 7/2018 | McLemore et al. | |
| 2004/0163639 A1* | 8/2004 | Kijimoto | A47J 37/1242 126/374.1 |
| 2014/0117103 A1 | 5/2014 | Rossi et al. | |
| 2014/0261006 A1* | 9/2014 | Huang | F24C 3/128 126/41 R |
| 2016/0374510 A1 | 12/2016 | Albizuri Landazabal | |
| 2019/0203942 A1* | 7/2019 | Green | F24C 3/124 |
| 2019/0309954 A1* | 10/2019 | Querejeta Andueza | F23N 5/203 |

OTHER PUBLICATIONS

English translation of China patent document No. CN206137958 dated May 3, 2017, https://patents.google.com/patent/CN206137958U/en?oq=CN206137958, accessed on Jul. 21, 2020.

* cited by examiner

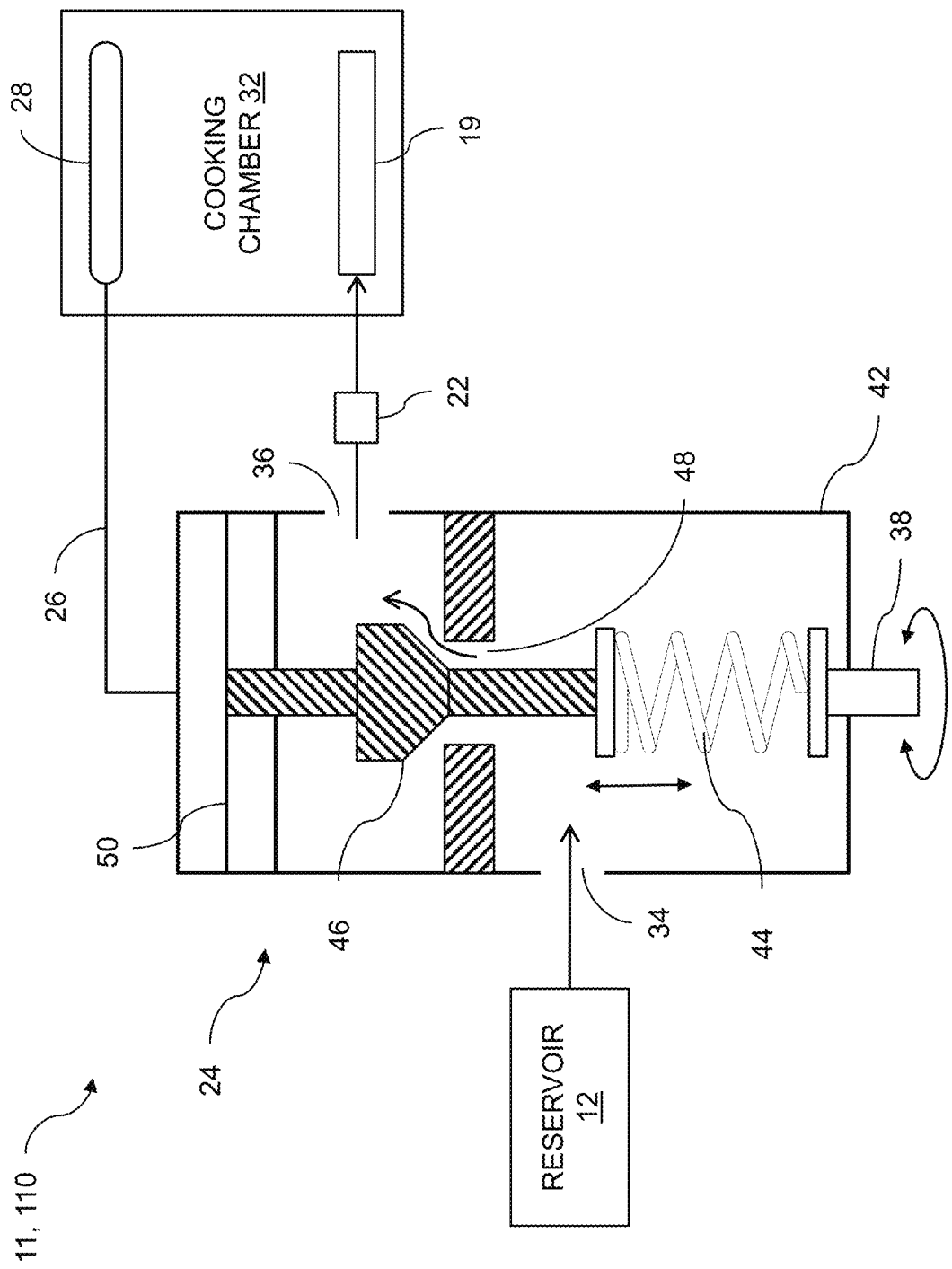

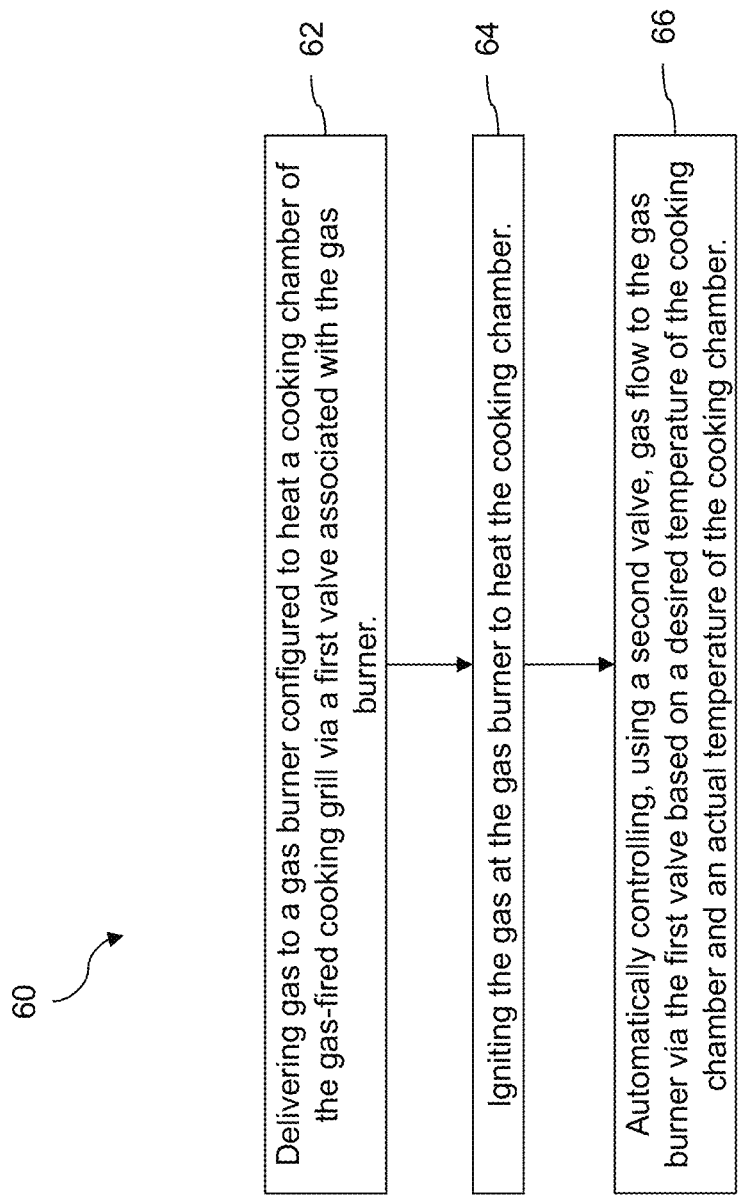

GAS GRILL WITH TEMPERATURE CONTROL

TECHNICAL FIELD

The disclosure relates generally to gas appliances, and more particularly to controlling a temperature within a chamber of a gas appliance such as a gas-fired cooking grill.

BACKGROUND

Typical outdoor gas-fired cooking grills include one or more burners for heating a cooking chamber and one or more manually adjustable valves to control gas flow to the burners. However, factors such as weather conditions (e.g., wind speed/direction, ambient temperature, precipitation) can affect the operation of the gas grill and also affect the temperature inside the cooking chamber of the gas grill for a given setting of the valves. This can make cooking using the gas grill difficult since actual cooking conditions may be uncertain and difficult to predict for various weather conditions. Improvement is desirable.

SUMMARY

In one aspect, the disclosure describes a gas-fired cooking grill comprising:
a cooking chamber;
a gas burner for heating the cooking chamber;
a first valve associated with the gas burner to control a gas flow to the gas burner; and
a second valve configured to controllably supply gas to the gas burner via the first valve, the second valve being automatically adjustable based on a desired temperature of the cooking chamber and an actual temperature of the cooking chamber.

The second valve may be a thermostatic valve.
The second valve may be a capillary-type thermostatic valve.
The second valve may be operatively connected to a capillary tube that is operatively connected to a bulb that is exposed to the actual temperature of the cooking chamber.
The second valve may be adjustable for setting the desired temperature of the cooking chamber.
The first valve may be manually adjustable.
The gas burner may be one of a plurality of gas burners for heating the cooking chamber. The gas-fired cooking grill may include a gas manifold for distributing the gas from the second valve to the plurality of gas burners.
The first valve may be one of a plurality of first valves. Each of the plurality of first valves may be associated with a respective one of the plurality of gas burners.
Embodiments may include combinations of the above features.

In another aspect, the disclosure describes a method of operating a gas-fired cooking grill. The method comprises:
delivering gas to a gas burner configured to heat a cooking chamber of the gas-fired cooking grill via a first valve associated with the gas burner;
igniting the gas at the gas burner to heat the cooking chamber; and
automatically controlling, using a second valve, gas flow to the gas burner via the first valve based on a desired temperature of the cooking chamber and an actual temperature of the cooking chamber.

The second valve may be a thermostatic valve.

The second valve may be a capillary-type thermostatic valve.
The method may comprise automatically adjusting the second valve using a capillary tube operatively connected to a bulb that is exposed to the actual temperature of the cooking chamber.
The first valve may be manually adjustable.
The method may comprise distributing the gas from the second valve to two or more gas burners via a gas manifold.
The method may comprise distributing the gas from the second valve to two or more gas burners via respective two or more first valves associated with the two or more gas burners.
Embodiments may include combinations of the above features.

In a further aspect, the disclosure describes a system for operating a gas-fired appliance. The system comprises:
a gas burner for heating a chamber of the gas-fired appliance;
a first valve associated with the gas burner to control a gas flow to the gas burner; and
a second valve configured to controllably supply gas to the gas burner via the first valve, the second valve being automatically adjustable based on a desired temperature of the chamber and an actual temperature of the chamber.

The second valve may be a thermostatic valve.
The second valve may be a capillary-type thermostatic valve.
The second valve may be operatively connected to a capillary tube that is operatively connected to a bulb that is exposed to the actual temperature of the chamber.
The second valve may be adjustable for setting the desired temperature of the chamber.
The first valve may be manually adjustable.
The gas burner may be one of a plurality of gas burners for heating the chamber. The system may include a gas manifold for distributing the gas from the second valve to the plurality of gas burners.
The first valve may be one of a plurality of first valves. Each of the plurality of first valves may be associated with a respective one of the plurality of gas burners.
Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 6 is an exemplary schematic representation of the system of FIG. 2 showing an exemplary internal configuration of the thermostatic valve of FIGS. 5A-5D;

FIG. 10 is a flow chart of an exemplary method of controlling a temperature of a cooking chamber of a gas grill.

DETAILED DESCRIPTION

The following disclosure describes systems and methods for operating a gas-fired appliance such as a cooking grill for example. One disclosed system includes one or more gas burners, one or more first valves and one or more second (e.g., thermostatic) valves located upstream from the one or more first valves. The one or more first valves are each associated with a respective one of the one or more gas burners to control a gas flow to the respective one(s) of the one or more gas burners. The second valve is automatically adjustable based on (e.g., a difference between) a desired temperature of the cooking chamber and an actual temperature of the cooking chamber. The second valve is configured to controllably supply gas to the one or more gas burners via the one or more first valves.

In various embodiments, aspects of the present disclosure may be particularly useful for controlling a temperature in a cooking chamber of a gas-fired cooking grill. In some embodiments, the use of the systems and methods described herein may improve control and predictability of cooking conditions within a cooking chamber of an outdoor gas-fired cooking grill.

Aspects of the present disclosure may also be useful for controlling the operation of other types of appliances such as gas-fired outdoor heaters, gas-fired fireplaces and gas-fired smokers for example. In various appliances, the systems and methods described herein may be used to control a temperature of a chamber such as a compartment, a partially enclosed space or cavity of such appliances.

The term "connected" or "coupled" may include both direct connection/coupling, in which two elements are connected/coupled to each other without any intermediate element(s), and indirect coupling, in which at least one additional element is located between the two elements.

The term "substantially" as used herein may be applied to modify any quantitative representation which could permissibly vary without resulting in a change in the basic function to which it is related.

Aspects of various embodiments are described through reference to the drawings.

Figure 1:
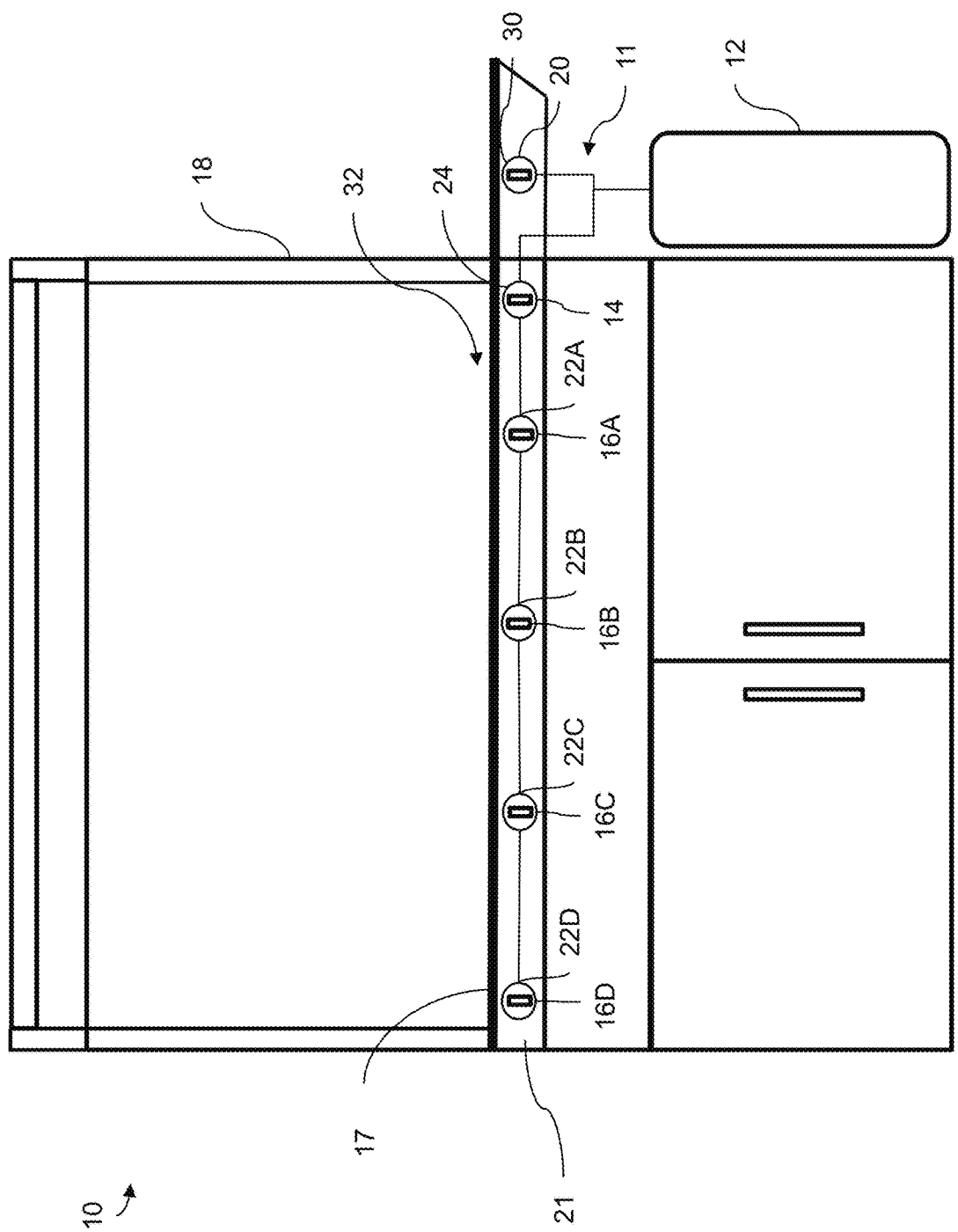
FIG. 1 is a front schematic view of a gas grill including an exemplary system for controlling a temperature of a cooking chamber of the gas grill.

FIG. 1 depicts a front schematic view of gas-fired cooking grill 10 including system 11 for operating gas grill 10. Gas grill 10 may include cooking grate 17 and lid 18. Lid 18 may be used to cover cooking grate 17 to create an enclosed cooking chamber 32 (also shown schematically in FIG. 2) for cooking food. Both cooking grate 17 and lid 18 may be made of a metallic material such as cast iron, stainless steel, or chrome-plated steel that can withstand the heat of grilling and that exhibits suitable corrosion resistance.

Figure 2:
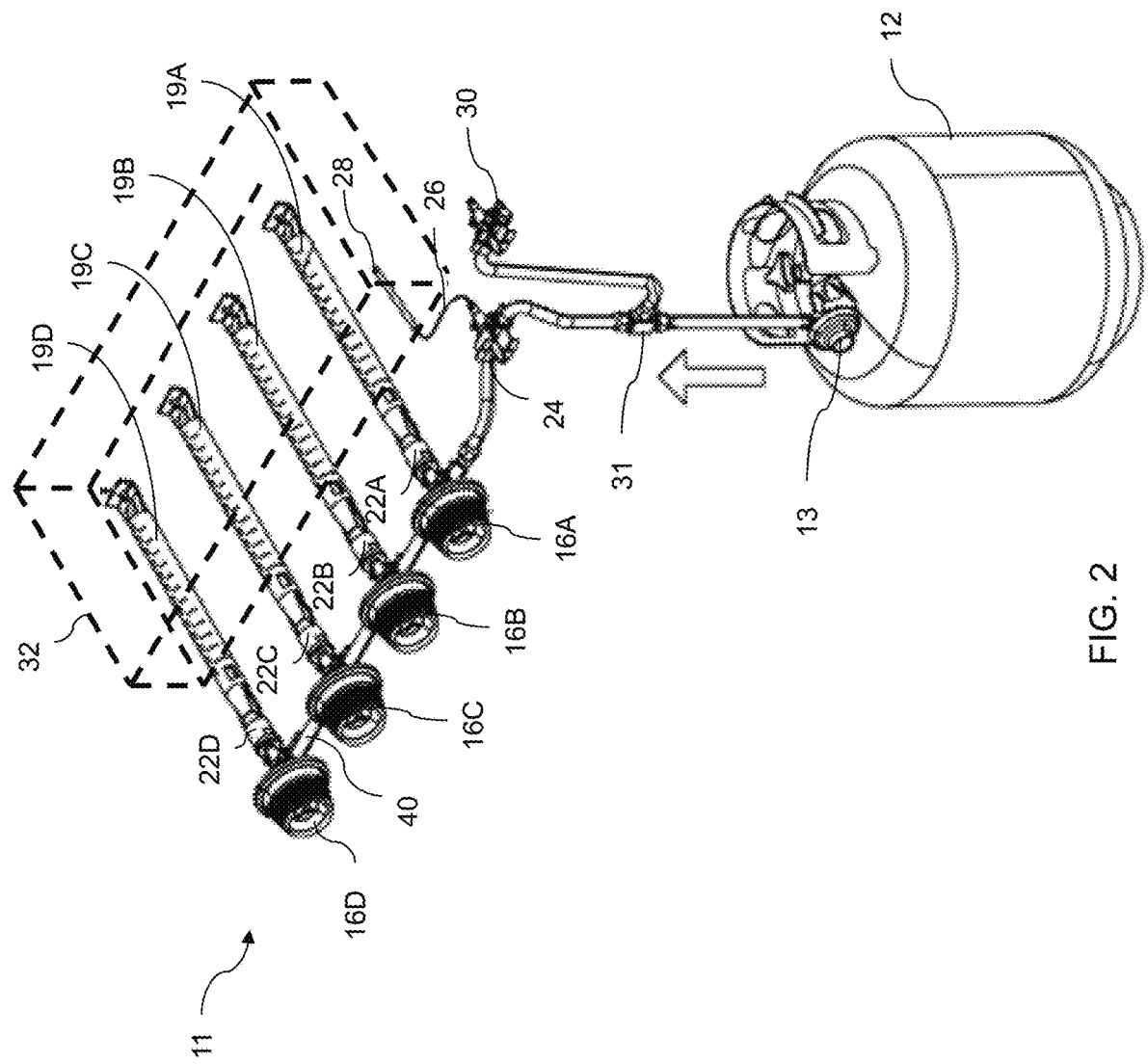
FIG. 2 is a perspective view of the system for controlling the temperature of the cooking chamber of the gas grill of FIG. 1.

System 11 may include fuel reservoir 12 for supplying gaseous fuel to burners 19A-19D (also referred generally herein as "burners 19") (see FIG. 2). In various embodiments, fuel reservoir 12 may be a tank containing propane, butane or natural gas for example. In some embodiments, fuel reservoir 12 may be a portable container releasably connectable to system 11. It is understood that system 11 may be connected to a fuel supply line from a (e.g., natural) gas utility instead of fuel reservoir 12. System 11 may also include pressure regulator 13 (shown in FIG. 2) which serves to regulate (e.g., reduce) the pressure of the gas being supplied to system 11 from fuel reservoir 12.

System 11 may include one or more first valves 22A-22D (also referred generally herein as "first valves 22") that are each operatively controlled by a respective one of control knobs 16A-16D (also referred generally herein as "control knobs 16"). Control knobs 16 may be used for adjusting a setting of a respective one of first valves 22. First vales 22A-22D may be manually adjustable by turning of control knobs 16.

System 11 may include second valve 24 that is operatively controlled by control knob 14. Control knob 14 may be used for adjusting a setting of second valve 24. Control knob 14 may be associated with, as described below, a display/indication of a range of temperatures for the purpose of specifying a desired temperature setting of cooking chamber 32. Control knob 14 may be manually adjusted to a temperature within the range of temperatures that is desired for cooking chamber 32 of gas grill 10. First valves 22A-22D may be of a different type than second valve 24.

In some embodiments, gas grill 10 may include a side burner (not shown) operatively controlled by third valve 30. Control knob 20 may be used for adjusting a setting of third valve 30. In some embodiments, first valve(s) 22A-22D and third valve 30 may be of the same type.

Control knobs 14, 16 and 20 may project from control panel 21 and corresponding valves 24, 22 and 30, respectively may be at least partially disposed behind control panel 21.

FIG. 2 shows a perspective view of system 11 of gas grill 10. System 11 may be connected to fuel reservoir 12 and may include gas burners 19, first valves 22 and second valve 24. Gas burners 19 may include perforated metallic tubes having internal passages for receiving gas via respective first valves 22 and second valve 24. Gas burners 19 may include perforations disposed along the metallic tubes for releasing the gas from the metallic tubes.

Fuel contained in fuel reservoir 12 may be supplied to flow splitter 31 that is configured to distribute gas between multiple branches of system 11. As depicted, gas may be supplied to second valve 24 and/or third valve 30 via flow splitter 31. Flow splitter 31 may be a tee pipe fitting for example.

Third valve 30 may be associated with a side burner (not shown) to control gas flow to the side burner. Third valve 30 may be adjustable to adjust the gas flow to the side burner. Third valve 30 may be adjusted using control knob 20 (shown in FIG. 1). The side burner may be external of chamber 32 and may be unaffected by a setting of second valve 24. In some embodiments, gas grill 10 may include one or more additional burners that are external of chamber 32 and/or may be unaffected by second valve 24. For instance, gas grill 10 may include one or more other optional (e.g., side or other) burners that bypass second valve 24 so as to be unaffected by a setting of second valve 24.

Each one of first valves 22 may be associated with a respective one of burners 19 and may be configured to control a gas flow to the respective one of gas burners 19. Burners 19 may be used for heating chamber 32. In some embodiments, burners 19 may be located within chamber 32. Burners 19 may be disposed under cooking grate 17 (shown in FIG. 1). Each one of first valves 22 may be adjustable to adjust respective gas flows supplied to burners 19. Each one of first valves 22 may be manually adjusted using a respective one of control knobs 16.

Second valve 24 may be located upstream of first valves 22 in system 11 and may be configured to controllably supply gas to burners 19 via first valves 22. First valve(s) 22 and second valve 24 may be disposed in series between fuel reservoir 12 and one or more of burners 19. Second valve 24 may be used for controlling a temperature of chamber 32. Second valve 24 may be adjustable for setting the desired temperature of chamber 32. A position of control knob 14 (shown in FIG. 1) may be indicative of the desired temperature of chamber 32. Second valve 24 may be automatically adjustable based on a desired temperature setting of chamber 32 and an actual temperature of chamber 32.

In some embodiments, second valve 24 may be a thermostatic valve automatically adjustable to control gas flow for maintaining a desired temperature at a location such as inside of cooking chamber 32. In some embodiments, second valve 24 may be operatively connected to a temperature sensing element such as capillary tube 26 that is operatively connected to temperature sensor bulb 28. Bulb 28 and capillary tube 26 may be integrally formed or may be separate components that are operatively connected to (e.g., in fluid communication with) each other. A suitable fluid (e.g., vapour or liquid) contained within bulb 28 or capillary tube 26 may expand when heated and contract when cooled and the change in pressure in bulb 28 and capillary tube 26 may cause closing and opening of second valve 24.

Bulb 28 may be located within chamber 32 of gas grill 10 and/or otherwise exposed to the actual temperature of chamber 32. It is understood that bulb 28 may be located in another location having a temperature related to the temperature within chamber 32. In some embodiments, second valve 24 may be a capillary-type thermostatic valve that includes capillary tube 26 and temperature sensing bulb 28. For example, second valve 24 may be of a type known as a thermal expansion valve or a thermostatic expansion valve (often abbreviated as TEV, TXV, or TX valve). Second valve 24 may function as a metering device for metering the flow of fuel to one or more burners 19 as a function of the temperature to which bulb 28 is exposed to maintain a desired temperature inside of the cooking chamber 32.

System 11 may also include gas manifold 40 for distributing the gas from second valve 24 to first valves 22. Manifold 40 may include an inlet for receiving gas from second valve 24 and a plurality of outlets for delivering the gas to first valves 22 and associated burners 19. Manifold 40 and other gas lines of system 11 may be implemented using suitable tubes and/or hoses and fittings for example.

Figure 3:
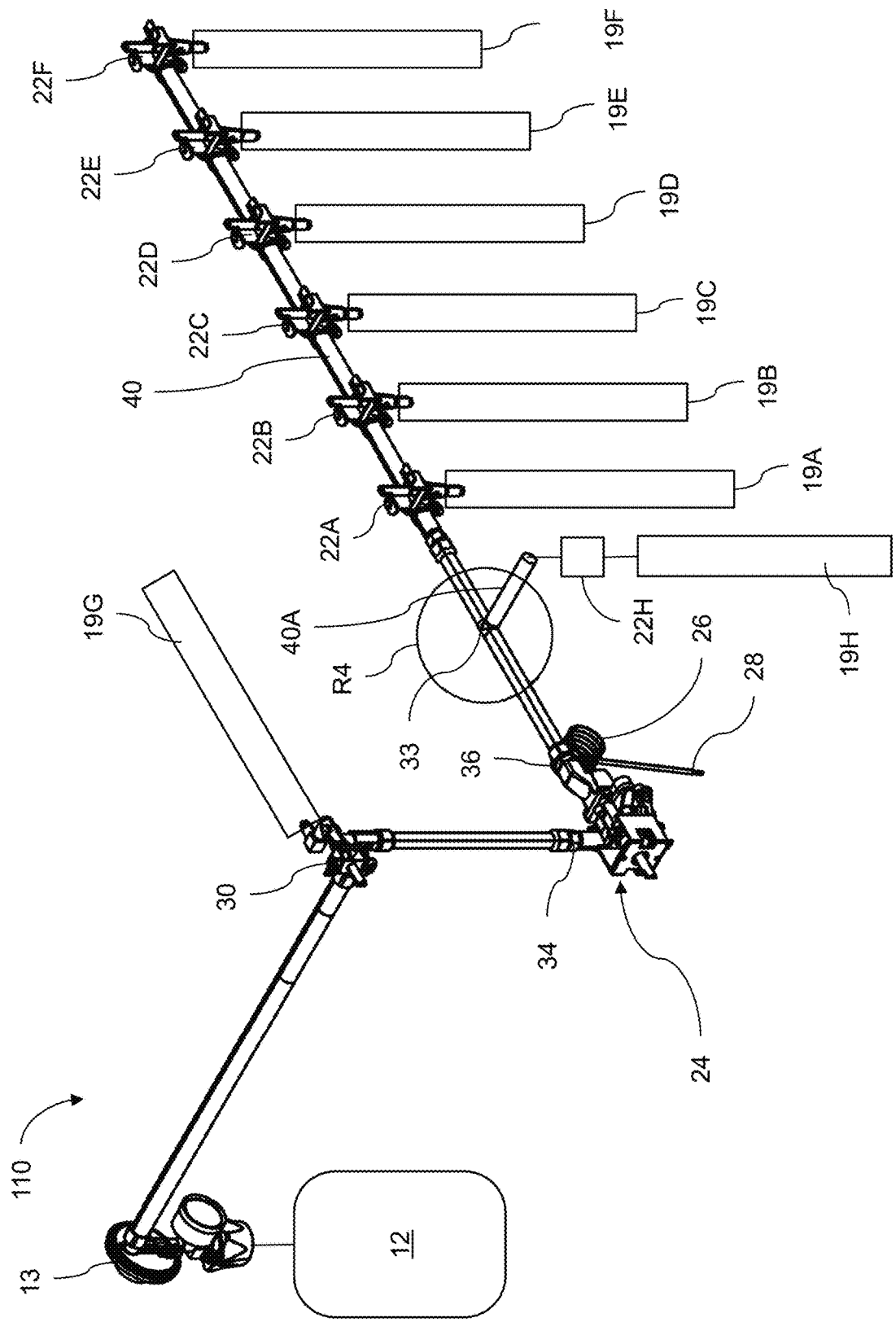
FIG. 3 is a perspective view of another exemplary system for controlling the temperature of the cooking chamber of the gas grill of FIG. 1.

Although FIGS. 1-2 show system 11 including four burners 19, it is understood that system 11 may include a different number of burners 19 (e.g. one, two, three, four, six or eight) that are each controllably supplied gas by an associated first valve 22. FIG. 3 is a perspective view of another exemplary system 110 for controlling the temperature of the cooking chamber of the gas grill of FIG. 1. System 110 may include elements that are identical or similar to those of system 11 and like elements are identified using like reference characters. Fuel reservoir 12 and burners 19 are shown schematically. System 110 may include any number of burners 19. For example, burners 19 may be main burners used to heat cooking chamber 32 of cooking grill 10.

System 110 may include one or more burners 19G that bypass second valve 24 and that may be controlled via one or more third valves 30. Such burners 19G may include a side burner and/or a (e.g., rear) rotisserie burner of cooking grill 10 for example.

System 110 may include one or more burners 19H that are disposed downstream of second valve 24 and that may also be controlled via second valve 24. Burners 19H may also be controllable via first valve 22H. Burner 19H may be disposed inside of cooking chamber 32 but may be disposed at a different location within cooking chamber 32. For example, burners 19A-19F may be disposed under cooking grate 17 and burner 19H may be a (e.g., rear) rotisserie burner that is disposed above cooking grate 17. It is understood that one of more gas manifolds 40 and associated burners 19 may be connected downstream of second valve 24 and may be controllable via second valve 24. For example, one or more additional gas manifolds 40A may be fluidly coupled to gas manifold 40 via tee fitting 33.

Figure 4:
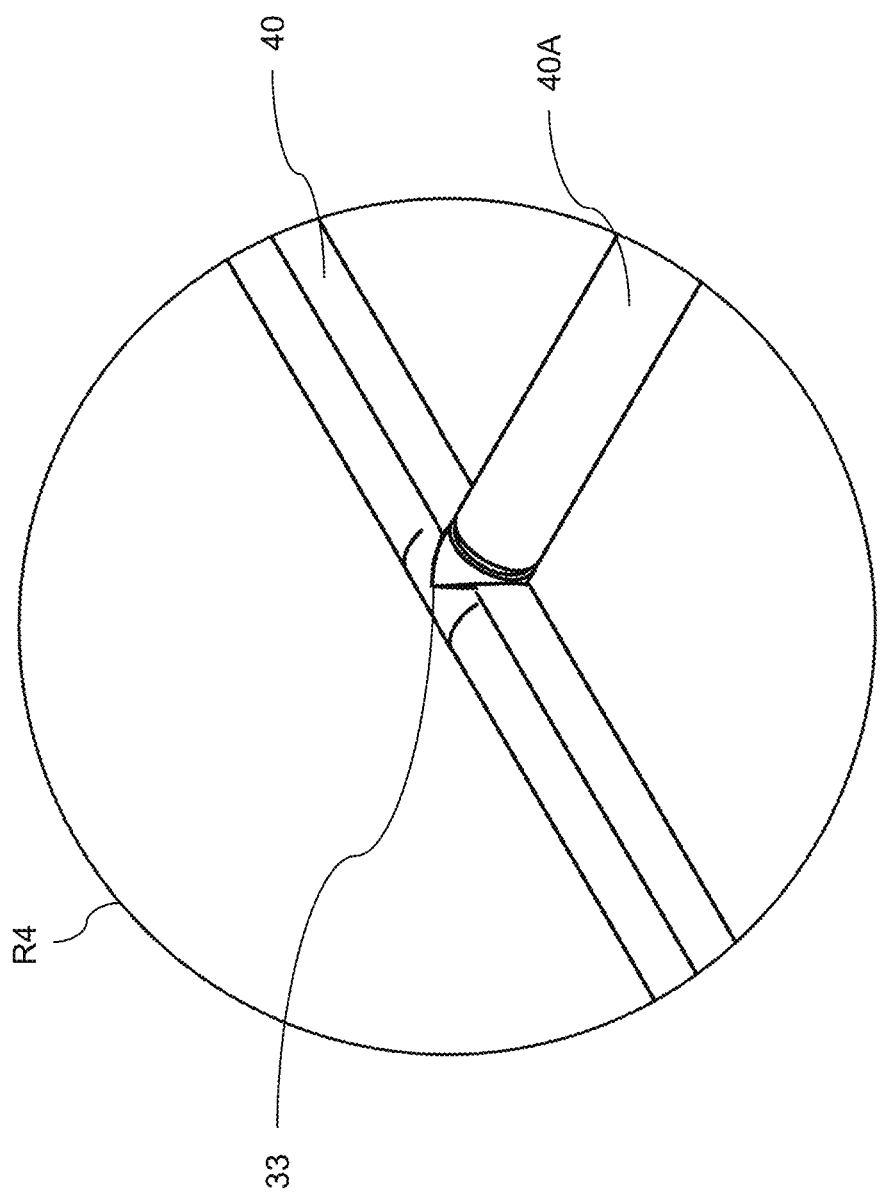
FIG. 4 is an enlarged view of region R4 of FIG. 3.
Figure 5A:
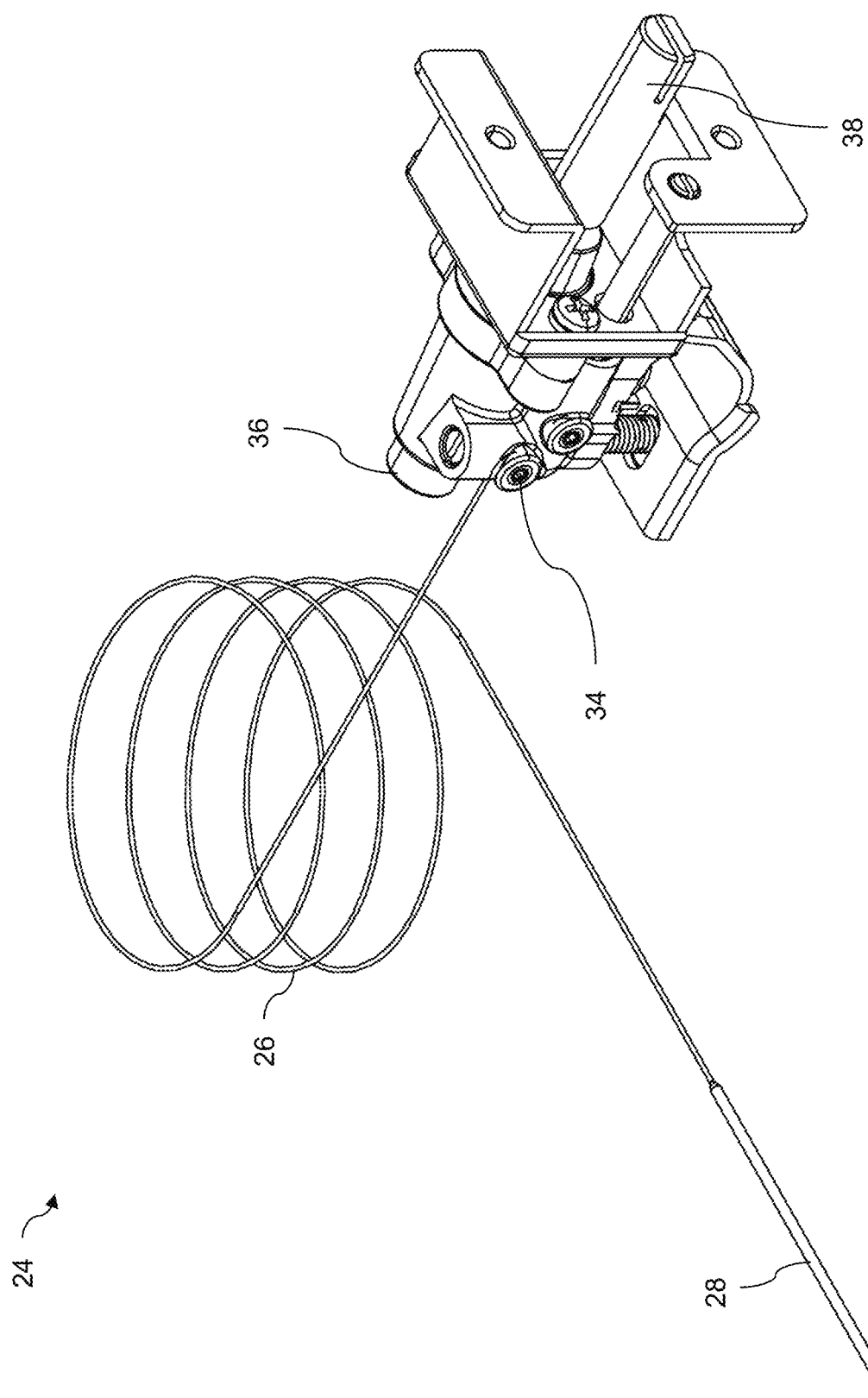
FIGS. 5A-5D are a perspective view, top view, front view and right side view, respectively of an exemplary thermostatic valve of the system of FIG. 2.
Figure 5B:
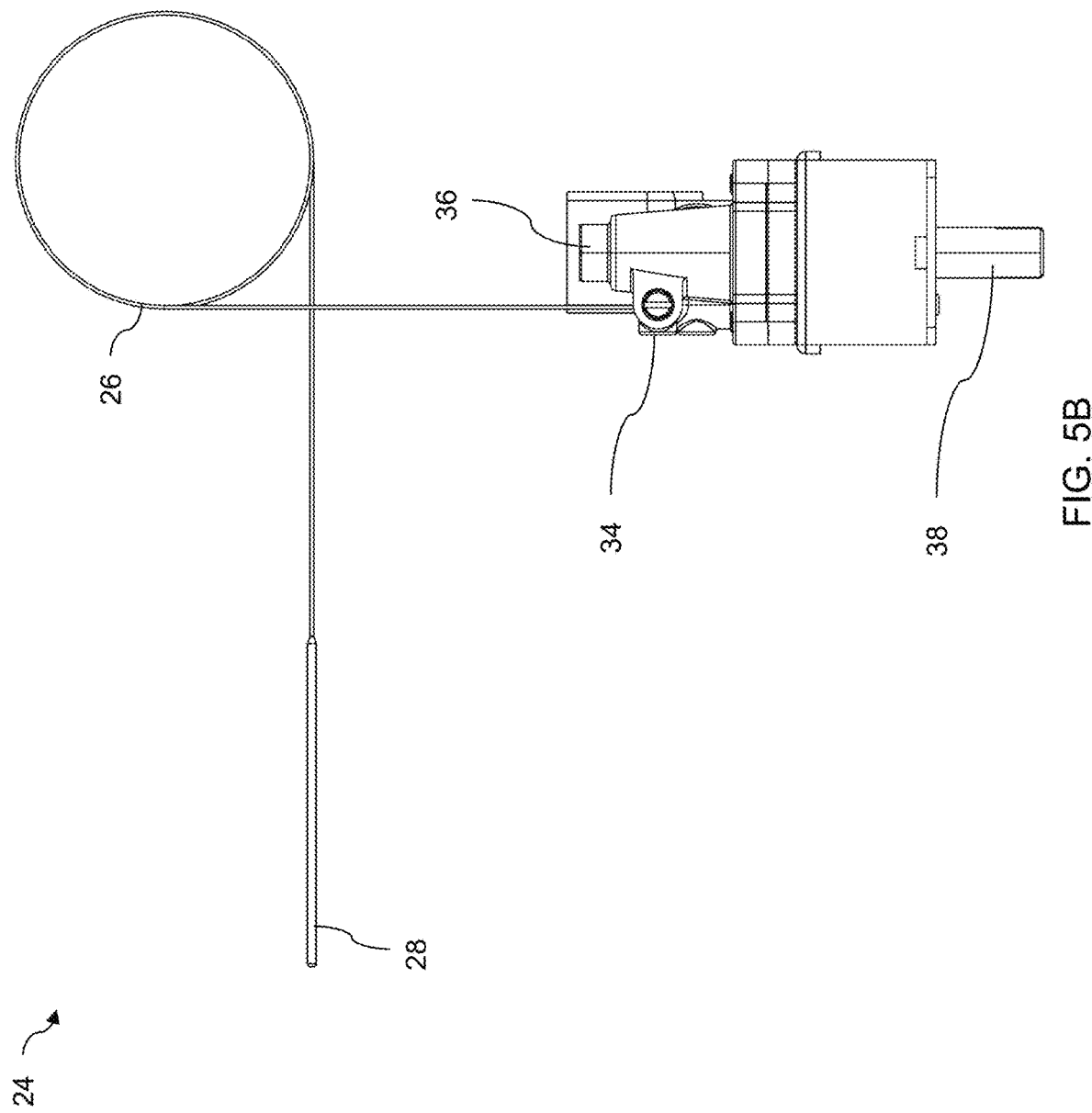
Figure 5C:
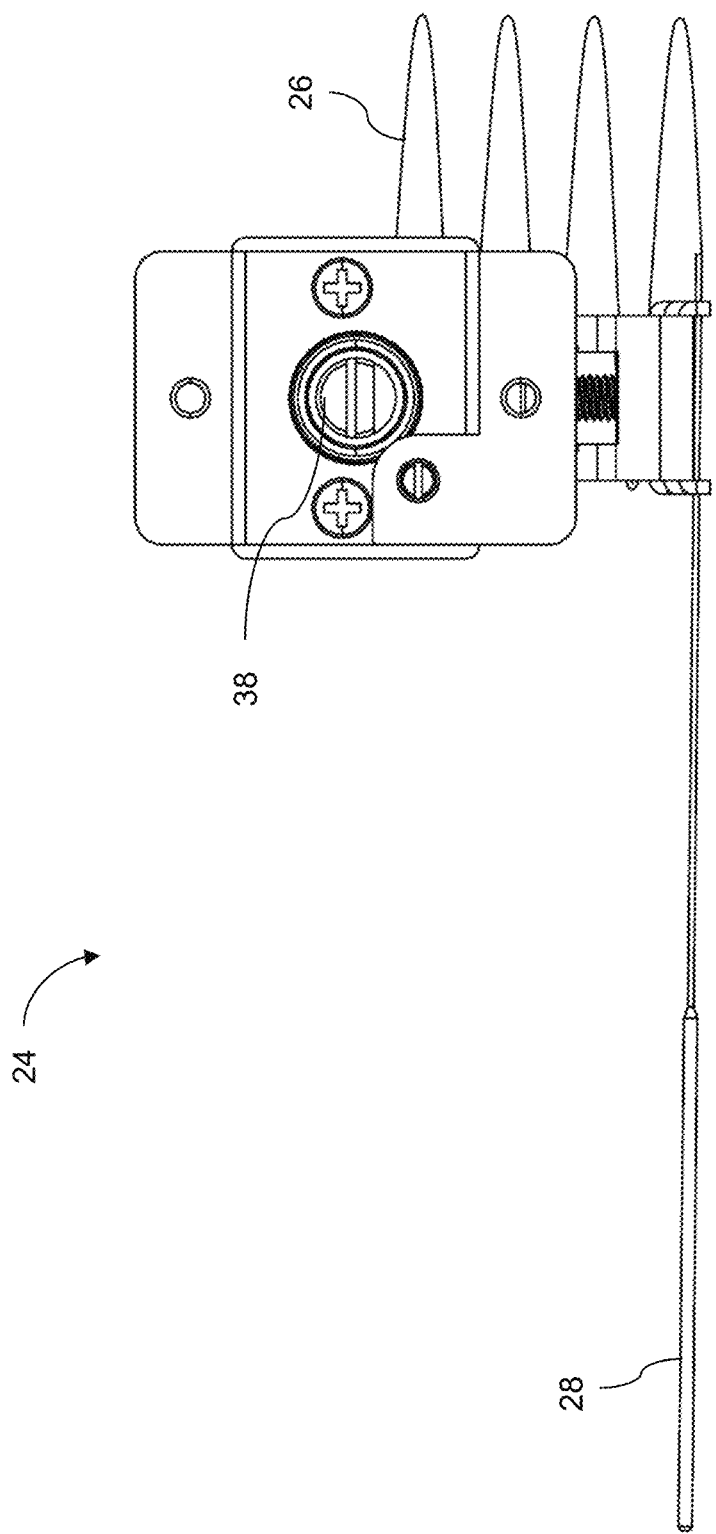
Figure 5D:
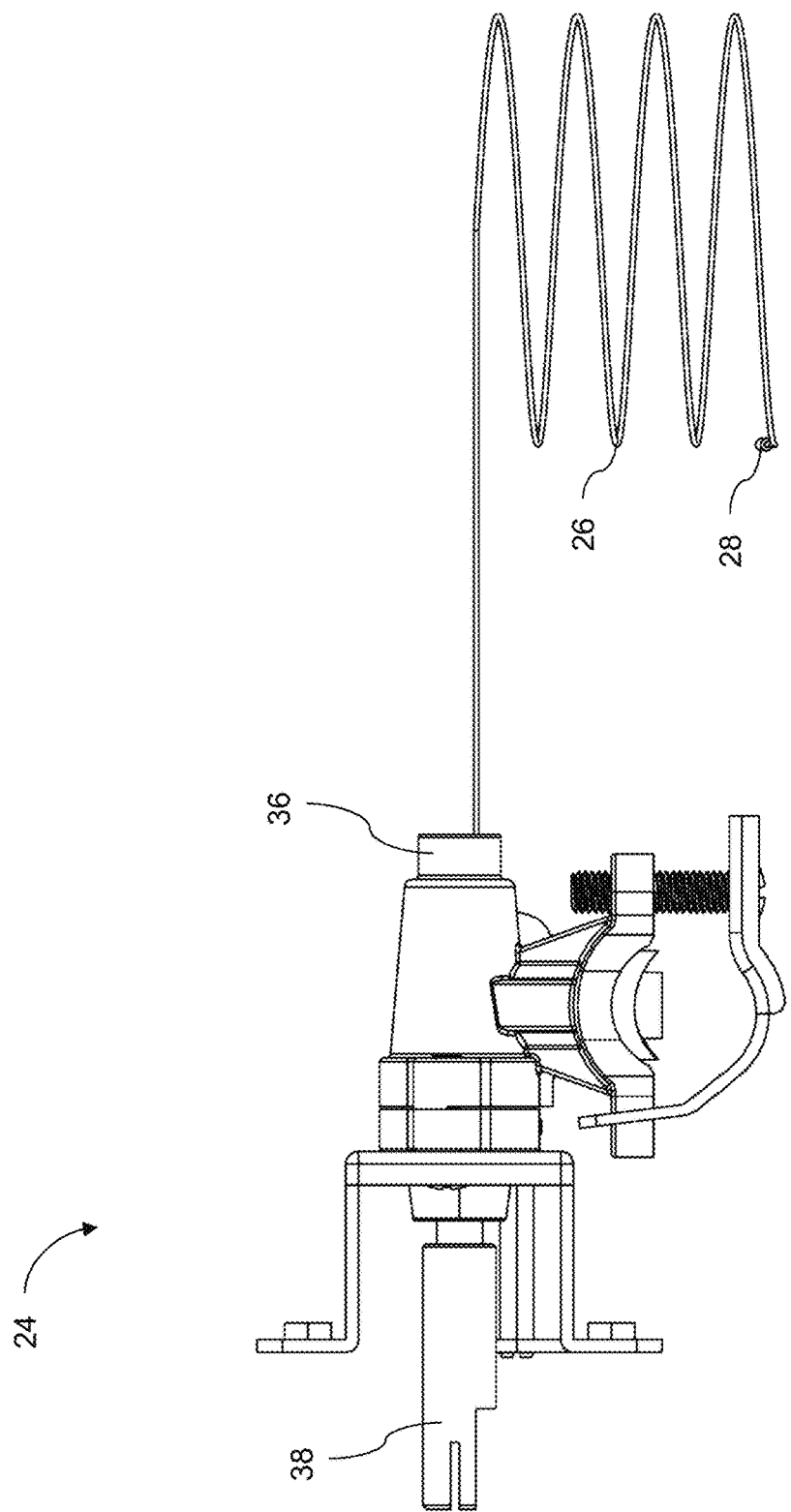

FIG. 4 is an enlarged view of region R4 of FIG. 3 showing additional gas manifold 40A being fluidly coupled to gas manifold 40 via tee fitting 33. Manifolds 40, 40A may be coupled to tee fitting 33 via threaded engagement or welding for example.

FIGS. 5A-5D are a perspective view, top view, front view and right side view, respectively, of an exemplary second valve 24. Control knob 14 has been removed from interface 38 which may be a rotatable shaft. Second valve 24 may include inlet 34 for receiving gas from fuel reservoir 12 and outlet 36 that is connected to manifold 40 (shown in FIGS. 2 and 3).

FIG. 6 is an exemplary schematic representation of systems 11, 110 showing an exemplary internal configuration of second (e.g., thermostatic) valve 24. Interface 38 may be rotatable and in threaded engagement with valve body 42 or other component and also be operatively coupled to an actuator such as spring 44 of second valve 24. Spring 44 may serve to influence the movement of valve member 46 to open or close orifice 48 through which gas from reservoir 12 is output to manifold 40. When control knob 14 is adjusted to cause rotation of interface 38, a preloading of spring 44 may be adjusted in order to adjust a compression amount thereof causing adjustment of a biasing force applied to valve member 46 by spring 44. Angular positions of knob 14 may be calibrated to corresponding exposure temperatures of bulb 28 and consequently set desired temperatures of chamber 32. The adjustment of control knob 14 may set an operating range of valve member 46 of second valve 24.

Fluid contained within capillary tube 26 and/or bulb 28 may have a coefficient of thermal expansion such that the exposure of bulb 28 to different temperatures may result in changes in volume of the fluid and/or changes in pressure within capillary tube 26 and bulb 28. Bulb 28 may be disposed within chamber 32 and exposed to elevated temperatures when gas grill 10 is in use. The fluid within bulb 28 may increase in temperature causing thermal expansion of the fluid. As a volume of the fluid within bulb 28 is increased, some of the fluid may be forced into capillary tube 26. The fluid in capillary tube 26 may engage with diaphragm 50 that is operatively coupled to valve member 46 and causes actuation of valve member 46 in response to changes in pressure inside of capillary tube 26. A magnitude of the force exerted on diaphragm 50 and the corresponding displacement of diaphragm 50 may be related to an actual temperature within chamber 32. An increase in pressure inside of capillary tube 26 caused by an increase in temperature inside of cooking chamber 32 may urge valve member 46 toward a closed position. In reference to FIG. 6, an increase in temperature inside of chamber 32 may cause diaphragm 50 to urge valve member 46 downwardly to cause closing of orifice 48 disposed between inlet 34 and outlet 36 of second valve 24.

Spring 44 may be engaged with valve member 46 and oppose the closing force applied to valve member 46 by diaphragm 50. In other words, spring 44 may urge valve member 46 toward an open position (e.g., upwardly in reference to FIG. 6). Accordingly, a net force exerted on valve member 46 by spring 44 and diaphragm 50 may dictate the position of valve member 46 relative to orifice 48. When an actual temperature of chamber 32 is lower than a desired temperature of chamber 32, the net force exerted on valve member 46 by spring 44 and diaphragm 50 may cause valve member 46 to move toward a fully open position to increase gas flow to burners 19. In contrast, when an actual temperature of chamber 32 is higher than a desired temperature of chamber 32, the net force exerted on valve member 46 may cause movement of valve member 46 toward the closed position to decrease gas flow to burners 19. In a situation where the temperature of chamber 32 is equal to the desired temperature of chamber 32 set via interface 38, the net force exerted on the valve member of second valve 24 may be zero and may result in valve member 46 of second valve 24 remaining stationary. Accordingly, second valve 24 may function as a feedback metering device for controlling the temperature inside of cooking chamber 32 based on the temperature selected via interface 38.

Figure 7:
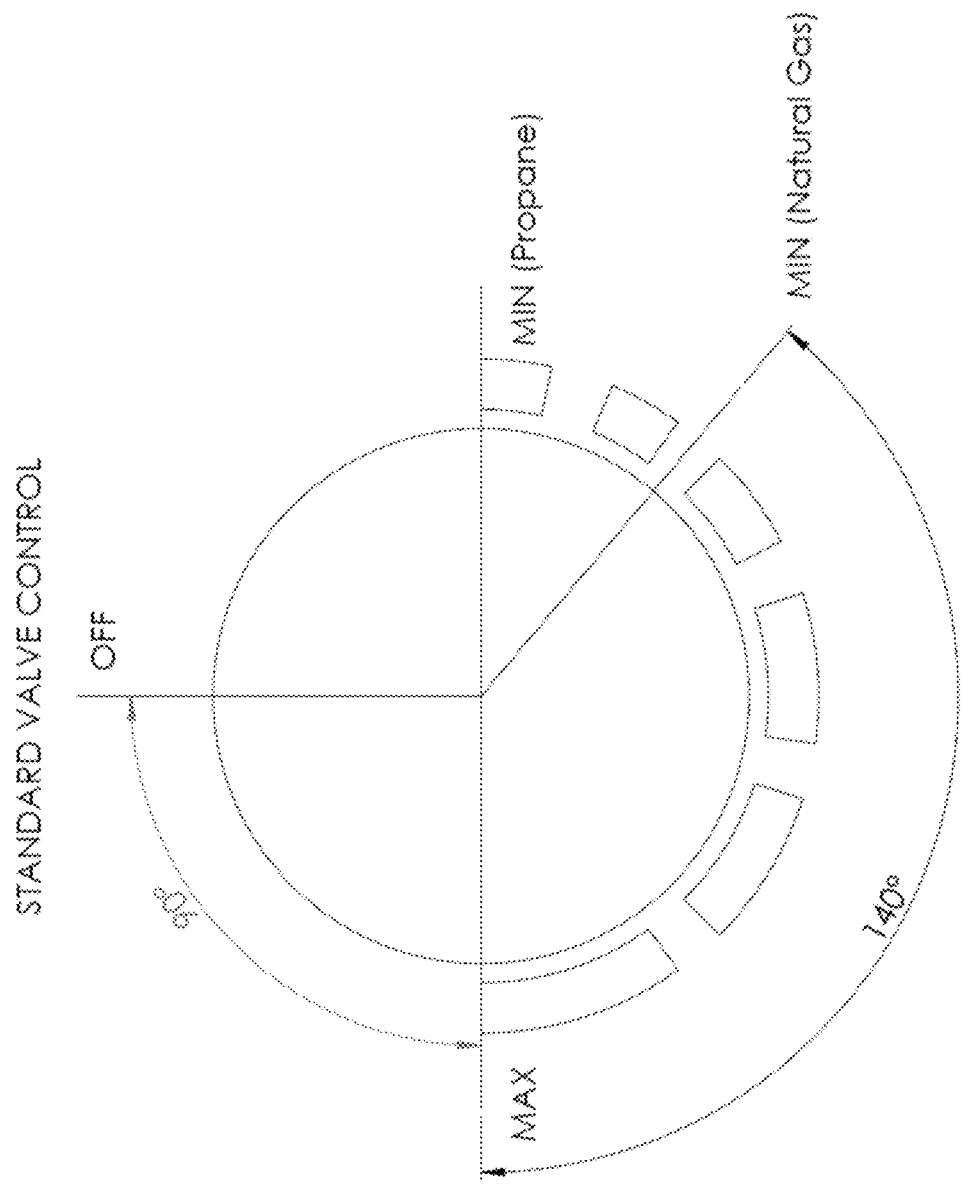
FIG. 7 illustrates an exemplary operating range for a control knob associated with a manually-actuatable valve of the system of FIG. 2.

FIG. 7 illustrates an exemplary operating range for control knob 16A for first valve 22A of system 11. The operating range includes different angular positions of control knob 16A corresponding to different (e.g., flow control) settings for first valve 22A. First valves 22A-22D may each be of a type suitable for on/off and throttling applications. First valves 22A-22D may be of a known type typically used on conventional gas grills or of other suitable type and may be manually adjustable via their respective knobs 16A-16D. First valve 22A may be configured to controllably supply gas to burner 19A based on an angular position of control knob 16A. For instance, when control knob 16A is set to MAX, first valve 22A may adopt a (e.g., wide open) position to permit maximum gas flow to burner 19A. When control knob 16A is set to MIN, first valve 22A may adopt a position that permits a non-zero minimum gas flow to burner 19A without extinguishing burner 19A. In some embodiments, control knob 16A may have different MIN settings based on a type of gas being supplied from fuel reservoir 12. MIN. (L.P) may correspond to a minimum gas flow setting for liquid propane and MIN. (N.G.) may correspond a minimum gas flow setting for natural gas. The flow rate of gas being supplied to burner 19A may be based on a setting set for first valve 22A and also based on a setting of second valve 24. It is understood that control knobs 16B-16D (and first valves 22B-22D) may operate in the same manner as control knob 16A (and first valve 22A).

Figure 8:
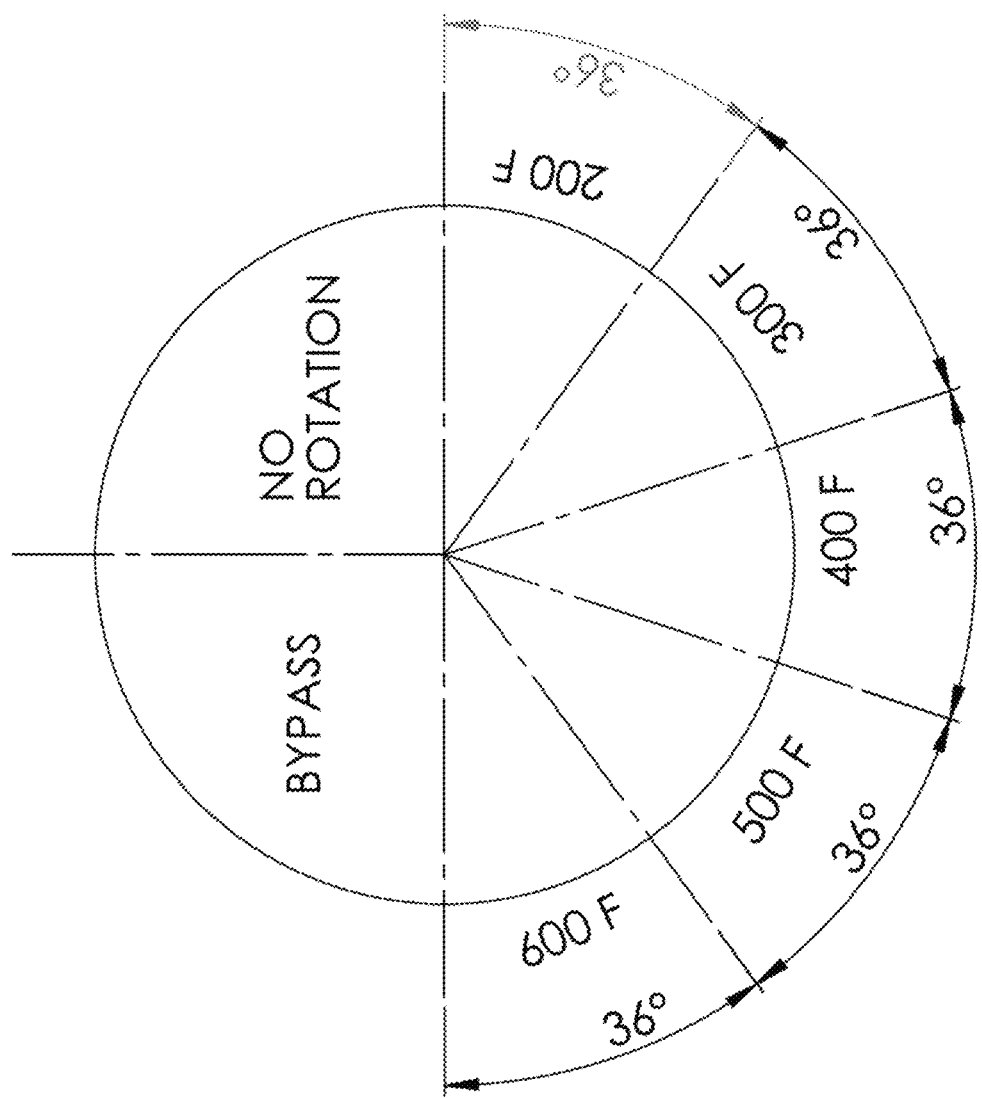
FIG. 8 illustrates an exemplary operating range for a control knob associated with the thermostatic valve of FIG. 6.

FIG. 8 illustrates exemplary operating ranges for control knob 14 (shown in FIG. 1) for second valve 24 of system 11. FIG. 8 shows different angular positions of control knob 14 corresponding to different temperature settings for cooking chamber 32. The different angular settings of control knob 14 may correspond to different angular settings of interface 38 of second valve 24 and consequently different preload amounts for spring 44. The diagram of FIG. 8 may be illustrated on cooking grill 10 with control knob 14 pivotable about a center of the diagram. Different sectors of the diagram may be associated with different temperature ranges. The diagram may also include a bypass region where second valve 24 stays in the fully open position allowing the temperature control function of second valve 24 to be bypassed and cooking grill 10 to be operated without such temperature control function if desired. For example, such mode of operation may be achieved by adjusting knob 14 to the "BYPASS" setting where second valve 24 may remain substantially fully open and then manually adjusting the gas flow to gas burners 19 via respective valves 22.

The BYPASS region may cause a relatively high preloading of spring 44 to substantially remove or significantly remove the influence of temperature variations of cooking chamber 32 on the position of valve member 46. On the other hand, when controlling the temperature inside of cooking chamber 32, the preloading of spring 44 and/or the range of movement of valve member 46 may be selected such that orifice 48 (shown in FIG. 6) is never fully closed. For example, valve member 46 may have a range of movement that extends between a fully open position and a partially closed position that corresponds to maintaining a minimum flame height on one or more burners 19 intended to prevent flameout. The diagram of FIG. 8 is intended to be used with knob 14 rotatable counter-clockwise from a 12 o'clock position to a 3 o'clock position.

Figure 9:
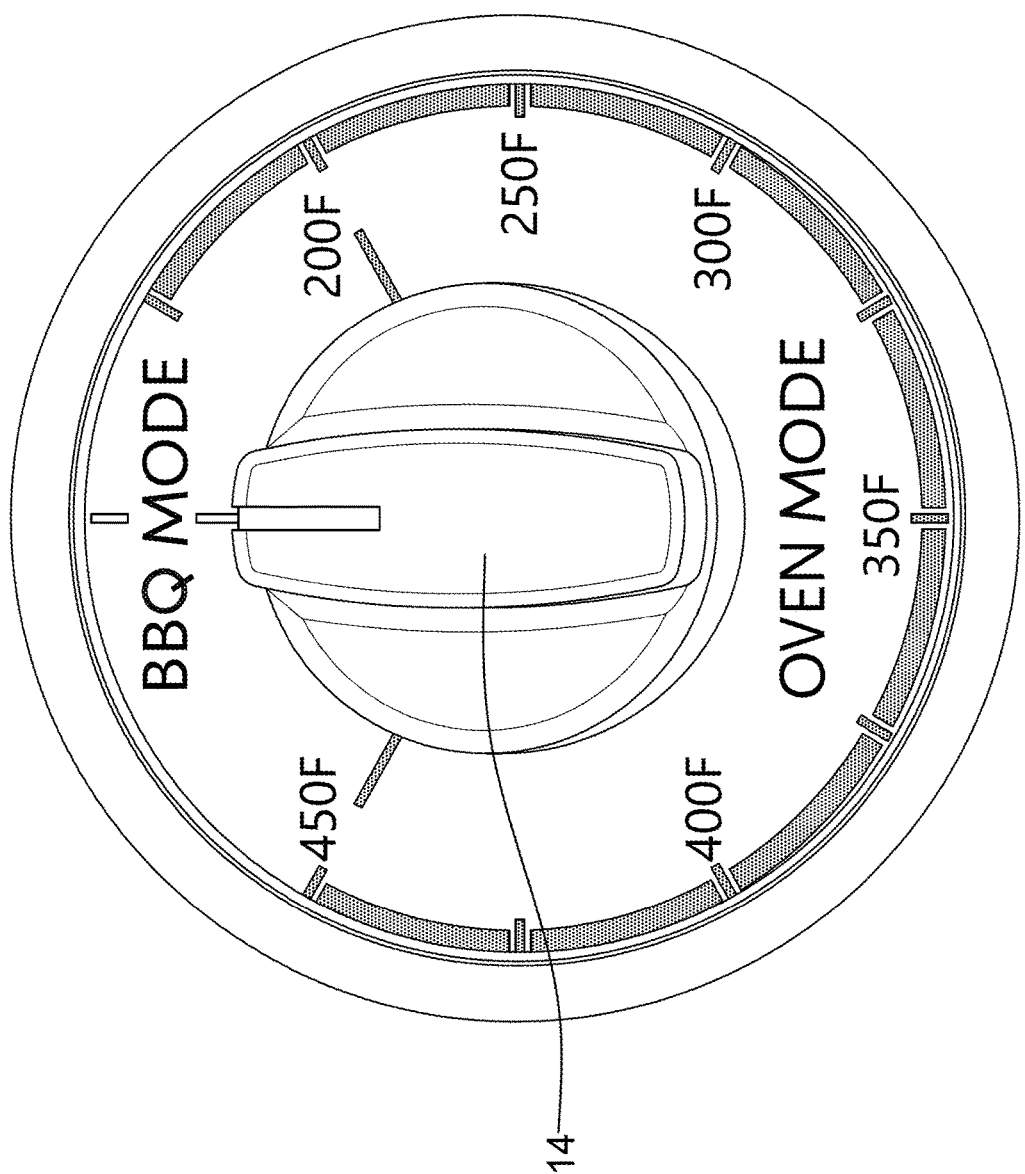
FIG. 9 is a front view of an exemplary control knob associated with the thermostatic valve of FIG. 6.

FIG. 9 is a front view of an exemplary control knob 14 together with another diagram of the type shown in FIG. 8. FIG. 9 shows discrete angular positions of knob 14 corresponding to different temperature settings for cooking chamber 32. Instead of the BYPASS region of FIG. 8, FIG. 9 shows a functionally equivalent "BBQ MODE" position of knob 14 where second valve 24 substantially remains in the fully open position and cooking grill 10 may be use as a conventional (i.e., barbeque) cooking grill 10 without temperature control being carried out by second valve 24. When knob 14 is turned to a desired temperature setting where gas flow through second valve 24 is controlled to reach and maintain the selected temperature of cooking chamber 32, this mode of operation of cooking grill 10 may be referred to as "OVEN MODE". When operated in OVEN MODE, second valve 24 may be configured to never fully close as explained above to prevent flameout of one or more burners 19.

In some situations, it may be desirable to set one or more of control knobs 16 to a MAX setting and to control burners 19 based on a desired temperature of cooking chamber 32 using control knob 14 which operatively controls second valve 24. Second valve 24 may be set to limit gas flow to each one of burners 19 based on a difference between the actual temperature of cooking chamber 32 and the temperature setting of control knob 14. In other words, second valve 24 in combination with capillary tube 26 and bulb 28 may provide feedback control of the flow of gas being delivered to one or more burners 19. By distributing the gas to the applicable burners 19 via gas manifold 40, the flow rate of gas being supplied to each one of burners 19 may be substantially equal for burners 19 that have first valves 22 set to a common setting. This configuration may be desired when some or all burners 19 are being used for cooking and a substantially uniform temperature distribution is desired within chamber 32.

A flow rate of gas being supplied to a given burner 19 may be a function of an angular position set for control knob 14 which operatively controls second valve 24 and an angular setting of each one of controls knobs 16 that operatively control a respective one of first valves 22. For instance, if control knob 14 is set to a specific temperature, control knob 16A is set to MIN, control knob 16B is set to MAX and control knobs 16C-16D are set OFF, a flow rate of gas supplied to burner 19A may be based on the specific temperature setting, an angular position of control knob 16A and an angular position of control knob 16B. In this case, the flow rate of gas supplied to burner 19A will be less than a flow rate of gas supplied to burner 19B.

When system 11 is integrated within gas-fired cooking grill 10, bulb 28 may be disposed at a central or other location within cooking chamber 32. In some situations, a temperature at a central location inside cooking chamber 32 may provide a suitable representation of an actual temperature within cooking chamber 32 as a whole, especially in a situation where all burners 19 are being used.

FIG. 10 is a flowchart of an exemplary method 60 of operating gas-fired cooking grill 10 or other cooking grill. It is understood that aspects of method 60 can be combined with other actions/steps described herein. In various embodiments, method 60 includes:

delivering gas to one or more burners 19 configured to heat a cooking chamber 32 of the gas-fired cooking gas grill 10 via one or more first valves 22 respectively associated with the one or more burners 19 (see block 62);

igniting the gas at the burner(s) 19 to heat the cooking chamber 32 (see block 64); and automatically controlling, using a second valve 24, gas flow to the one or more burners 19 via the one or more first valves 22 based on a desired temperature of the cooking chamber 32 and an actual temperature of the cooking chamber 32 (see block 66).

In some embodiments, method 60 may include automatically adjusting the second valve 24 using a capillary tube 26 operatively connected to a bulb 28 that is exposed to the actual temperature of cooking chamber 32.

In some embodiments, method 60 may include adjusting the one or more first valves 22 to adjust respective gas flows to the one or more burners 19.

In some embodiments, method 60 may include distributing the gas from the second valve 24 to the one or more first valves 22 using a manifold 40.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the systems and methods are described in relation to gas-fired cooking grill but it is understood the systems and methods described herein are also applicable to other gas-fired appliances such as a gas-fired smoker, a gas-fired heater or a gas-fired fireplace. The manual and mechanical control of various aspects of system 11 in some embodiments may be advantageous because no electrical power source is required to operate some embodiments of system 11. However, it is understood that first valves 22 and/or second valve 24 may be electrically operated via electric motors/actuators and controllable via a suitable user interface such as a control panel or display. It is understood that second valve 24 could be implemented in other feedback control arrangements including a digital temperature controller and temperature sensing means such as a thermocouple or a thermistor for example. Yet further modifications could be implemented by a person of ordinary skill in the art in view of the present disclosure, which modifications would be within the scope of the present technology.

What is claimed is:

1. A gas-fired cooking grill comprising:
    a cooking chamber including a cooking grate;
    a gas burner for heating the cooking chamber;
    a first valve associated with the gas burner to control a gas flow to the gas burner; and
    a second valve configured to controllably supply gas to the gas burner via the first valve, the second valve being automatically adjustable based on a desired temperature of the cooking chamber and an actual temperature of the cooking chamber using a capillary tube operatively connected to a bulb that is exposed to the actual temperature of the cooking chamber, the second valve being configured to meter the gas flow to the gas burner as a function of the actual temperature of the cooking chamber to which the bulb is exposed to maintain the desired temperature inside of the cooking chamber.

2. The gas-fired cooking grill of claim 1, wherein the second valve is adjustable for setting the desired temperature of the cooking chamber.

3. The gas-fired cooking grill of claim 1, wherein the first valve is manually adjustable for throttling the gas flow to the gas burner.

4. The gas-fired cooking grill of claim 1, wherein:
    the gas burner is located within the cooking chamber;
    the gas burner is one of a plurality of gas burners for heating the cooking chamber; and
    the gas-fired cooking grill includes a gas manifold for distributing the gas from the second valve to the plurality of gas burners.

5. The gas-fired cooking grill of claim 4, wherein:
    the first valve is one of a plurality of first valves; and
    each of the plurality of first valves is associated with a respective one of the plurality of gas burners.

6. A method of operating a gas-fired cooking grill, the method comprising:
    delivering gas to a gas burner configured to heat a cooking chamber of the gas-fired cooking grill via a manually adjustable first valve associated with the gas burner, the cooking chamber including a cooking grate;
    igniting the gas at the gas burner to heat the cooking chamber; and
    automatically controlling, using a second valve, gas flow to the gas burner via the first valve based on a desired temperature of the cooking chamber and an actual temperature of the cooking chamber by automatically adjusting the second valve using a capillary tube operatively connected to a bulb that is exposed to the actual temperature of the cooking chamber,
    wherein automatically controlling, using the second valve, the gas flow to the gas burner via the first valve includes metering the gas flow to the gas burner as a function of the actual temperature of the cooking chamber to which the bulb is exposed to maintain the desired temperature inside of the cooking chamber.

7. The method of claim 6,
comprising, when automatically controlling the gas flow to the gas burner, preventing the second valve from fully closing to prevent flameout of the gas burner.

8. The method of claim 6, comprising distributing the gas from the second valve to two or more gas burners via a gas manifold.

9. The method of claim 6, comprising distributing the gas from the second valve to two or more gas burners via respective two or more first valves associated with the two or more gas burners.

10. A system for operating a gas-fired appliance, the system comprising:
    a gas burner located within a cooking chamber for heating the cooking chamber of the gas-fired appliance;

a first valve associated with the gas burner to control a gas flow to the gas burner; and a second valve configured to controllably supply gas to the gas burner via the first valve, the second valve being automatically adjustable based on a desired temperature of the chamber and an actual temperature of the chamber using a capillary tube operatively connected to a bulb that is exposed to the actual temperature of the cooking chamber, the second valve being configured to meter the gas flow to the gas burner as a function of the actual temperature of the cooking chamber to which the bulb is exposed to maintain the desired temperature inside of the cooking chamber.

11. The system of claim 10, wherein the second valve is adjustable for setting the desired temperature of the chamber.

12. The system of claim 10, wherein the first valve is manually adjustable.

13. The system of claim 10, wherein the gas burner is one of a plurality of gas burners for heating the chamber, and the system includes a gas manifold for distributing the gas from the second valve to the plurality of gas burners.

14. The system of claim 13, wherein:
the first valve is one of a plurality of first valves; and
each of the plurality of first valves is associated with a respective one of the plurality of gas burners.

\* \* \* \* \*